(12) United States Patent
Huang et al.

(10) Patent No.: US 11,087,449 B2
(45) Date of Patent: Aug. 10, 2021

(54) DEEP LEARNING NETWORKS FOR NUISANCE FILTERING

(71) Applicant: KLA Corporation, Milpitas, CA (US)

(72) Inventors: Tong Huang, Saratoga, CA (US); Pavan Kumar Perali, San Ramon, CA (US); Jie Gong, San Jose, CA (US); Yong Zhang, Cupertino, CA (US)

(73) Assignee: KLA Corp., Milpitas, CA (US)

( * ) Notice: Subject to any disclaimer, the term of this patent is extended or adjusted under 35 U.S.C. 154(b) by 0 days.

(21) Appl. No.: 16/663,283

(22) Filed: Oct. 24, 2019

(65) Prior Publication Data

US 2021/0125325 A1 Apr. 29, 2021

(51) Int. Cl.
*G06T 7/00* (2017.01)
*G06T 5/20* (2006.01)
*G06T 5/00* (2006.01)

(52) U.S. Cl.
CPC ............ *G06T 7/0004* (2013.01); *G06T 5/002* (2013.01); *G06T 5/20* (2013.01); *G06T 2207/10061* (2013.01); *G06T 2207/20084* (2013.01); *G06T 2207/30148* (2013.01)

(58) Field of Classification Search
None
See application file for complete search history.

(56) References Cited

U.S. PATENT DOCUMENTS

| 7,782,452 B2 | 8/2010 | Mehanian et al. |
| 8,126,255 B2 | 2/2012 | Bhaskar et al. |
| 8,664,594 B1 | 4/2014 | Jiang et al. |
| 8,692,204 B2 | 4/2014 | Kojima et al. |
| 8,698,093 B1 | 4/2014 | Gubbens et al. |
| 8,716,662 B1 | 5/2014 | MacDonald et al. |
| 9,222,895 B2 | 12/2015 | Duffy et al. |
| 10,489,478 B2 * | 11/2019 | Lim .................. G06F 17/153 |
| 2008/0310704 A1 * | 12/2008 | Tachibana ............ H01J 37/21 |
| | | 382/148 |

(Continued)

OTHER PUBLICATIONS

Wu X., Cao K., Gu X. (2017) A Surface Defect Detection Based on Convolutional Neural Network. In: Liu M., Chen H., Vincze M. (eds) Computer Vision Systems. ICVS 2017. Lecture Notes in Computer Science, vol. 10528. Springer, Cham, https://doi.org/10.1007/978-3-319-68345-4_17 (Year: 2017).*

(Continued)

*Primary Examiner* — Andrae S Allison
(74) *Attorney, Agent, or Firm* — Ann Marie Mewherter

(57) ABSTRACT

Methods and systems for detecting defects on a specimen are provided. One system includes a first deep learning (DL) network configured for filtering nuisances from defect candidates detected on a specimen. Output of the first DL network includes a first subset of the defect candidates not filtered as the nuisances. The system also includes a second DL network configured for filtering nuisances from the first subset of the defect candidates. Computer subsystem(s) input high resolution images acquired for the first subset of the defect candidates into the second DL network. Output of the second DL network includes a final subset of the defect candidates not filtered as the nuisances. The computer subsystem(s) designate the defect candidates in the final subset as defects on the specimen and generate results for the defects.

27 Claims, 5 Drawing Sheets

(56) References Cited

U.S. PATENT DOCUMENTS

| | | | |
|---|---|---|---|
| 2012/0029858 A1 | 2/2012 | Kulkarni et al. | |
| 2014/0072204 A1* | 3/2014 | Minekawa | G06T 7/001 |
| | | | 382/149 |
| 2016/0005157 A1 | 1/2016 | Toyoda et al. | |
| 2016/0104600 A1 | 4/2016 | Luo et al. | |
| 2017/0140524 A1 | 5/2017 | Karsenti et al. | |
| 2017/0148226 A1 | 5/2017 | Zhang | |
| 2017/0193400 A1 | 7/2017 | Bhaskar et al. | |
| 2017/0193680 A1 | 7/2017 | Zhang et al. | |
| 2017/0194126 A1 | 7/2017 | Bhaskar et al. | |
| 2017/0200260 A1* | 7/2017 | Bhaskar | G06K 9/6271 |
| 2017/0200264 A1 | 7/2017 | Park et al. | |
| 2017/0200265 A1 | 7/2017 | Bhaskar et al. | |
| 2017/0323435 A1 | 11/2017 | Minekawa et al. | |
| 2017/0345140 A1 | 11/2017 | Zhang et al. | |
| 2017/0351952 A1 | 12/2017 | Zhang et al. | |
| 2018/0107928 A1 | 4/2018 | Zhang et al. | |
| 2018/0232873 A1* | 8/2018 | Inoue | G06T 7/001 |
| 2018/0266968 A1* | 9/2018 | Hirai | H01L 22/12 |
| 2018/0293721 A1 | 10/2018 | Gupta et al. | |
| 2018/0315153 A1* | 11/2018 | Park | G06N 3/08 |
| 2018/0330511 A1 | 11/2018 | Ha et al. | |
| 2019/0004504 A1* | 1/2019 | Yati | G05B 19/41875 |
| 2019/0005629 A1 | 1/2019 | Dandiana et al. | |
| 2019/0073566 A1 | 3/2019 | Brauer | |
| 2019/0073568 A1 | 3/2019 | He et al. | |
| 2019/0213733 A1* | 7/2019 | Yati | H01L 22/12 |
| 2020/0025690 A1* | 1/2020 | Koshihara | G06T 7/44 |

OTHER PUBLICATIONS

Y. Yuan-Fu, "A Deep Learning Model for Identification of Defect Patterns in Semiconductor Wafer Map," 2019 30th Annual SEMI Advanced Semiconductor Manufacturing Conference (ASMC), Saratoga Springs, NY, USA, 2019, pp. 1-6, doi: 10.1109/ASMC.2019. 8791815. (Year: 2019).*

Hand et al., "Principles of Data Mining (Adaptive Computation and Machine Learning)," MIT Press, Aug. 1, 2001, 578 pages.

He et al., "Deep Residual Learning for Image Recognition," arXiv:1512. 03385v1, Dec. 10, 2015, 12 pages.

Jebara, "Discriminative, Generative, and Imitative Learning," MIT Thesis, Feb. 2002, 212 pages.

Krizhevsky et al., "ImageNet Classification with Deep Convolutional Neural Networks," NIPS, Jan. 2012, 9 pages.

Simonyan et al., "Very Deep Convolutional Networks for Large-Scale Image Recognition," presented at International Conference on Learning Representations (ICLR) 2015, Apr. 10, 2015, 14 pages.

Sugiyama, "Introduction to Statistical Machine Learning," Morgan Kaufmann, Oct. 9, 2015, 534 pages.

Szegedy et al., "Going Deeper with Convolutions," 2015 IEEE Conference on Computer Vision and Pattern Recognition (CVPR), Jun. 2015, 9 pages.

International Search Report and Written Opinion for PCT/US2020/ 056246 dated Feb. 2, 2021.

* cited by examiner

DEEP LEARNING NETWORKS FOR NUISANCE FILTERING

BACKGROUND OF THE INVENTION

1. Field of the Invention

The present invention generally relates to methods and systems configured for nuisance filtering by deep learning networks.

2. Description of the Related Art

The following description and examples are not admitted to be prior art by virtue of their inclusion in this section.

Inspection processes are used at various steps during a semiconductor manufacturing process to detect defects on wafers and other substrates to drive higher yield in the manufacturing process and thus higher profits. Inspection has always been an important part of fabricating semiconductor devices. However, inspection methods have effectively not changed for more than 20 years. Inspection solutions essentially have the following characteristics: a substantially slow electron beam type system that allows a user to identify and verify problems for physical defects; and separately a substantially fast but coarse optical inspector that covers the entire wafer, but is often limited to a single layer of inspection. These two systems are typically separate.

Conventional lithographic scaling (at 193 nm) has slowed. In addition, extreme ultraviolet (EUV) based scaling while progressing is also happening slowly. Newer applications such as driverless cars, sensors, deep learning (DL) training and inference have resulted in a new focus on computational architectures instead of relying on scaling. As an example, for both high performance computing (HPC) and DL systems, the overall system performance would benefit from a close proximity of memory and central processing unit (CPU) logic. So computer architects are focusing more on chip-to-chip interconnects, wafer scale integration, etc., and re-distribution layers (RDL). These layers are often re-constituted dice, hence the currently used align and subtract defect detection methods will fail as inspection methods for such layers. Currently used segmentation techniques also have become difficult because the amount of nuisance compared to defects of interest (DOIs) is significantly high.

For some layers, nuisance suppression may be particularly difficult because a typical wafer may only contain 10-20 events that represent DOI whereas the nuisance rate can be in the 100,00 to million range. Therefore, the current methods for setting up nuisance filters and/or performing nuisance filtering for inspection can take a prohibitively long time. In addition, the scarcity of DOI, particularly compared to nuisance, available for selecting and setting up the nuisance filters for inspection can further increase the time required for the inspection setup. Furthermore, the limited number of DOIs available for nuisance filter setup can result in sub-optimal nuisance filters for inspection, which can diminish the performance capability of such inspection.

Accordingly, it would be advantageous to develop systems and methods for filtering nuisances from defect candidates detected on a specimen that do not have one or more of the disadvantages described above.

SUMMARY OF THE INVENTION

The following description of various embodiments is not to be construed in any way as limiting the subject matter of the appended claims.

One embodiment relates to a system configured to detect defects on a specimen. The system includes one or more computer subsystems configured for detecting defect candidates on a specimen based on output generated for the specimen by an inspection subsystem. The system also includes one or more components executed by the one or more computer subsystems. The one or more components include a first deep learning (DL) network configured for filtering nuisances from the defect candidates. The computer subsystem(s) input information for the defect candidates into the first DL network. Output of the first DL network includes a first subset of the defect candidates not filtered as the nuisances. The component(s) also include a second network configured for filtering nuisances from the first subset of the defect candidates. The one or more computer subsystems input high resolution images acquired for the first subset of the defect candidates into the second DL network. Output of the second DL network includes a final subset of the defect candidates not filtered as the nuisances. The computer subsystem(s) are configured for designating the defect candidates in the final subset as defects on the specimen and generating results for the defects. The system may be further configured as described herein.

Another embodiment relates to a computer-implemented method for detecting defects on a specimen. The method includes detecting defect candidates on a specimen based on output generated for the specimen by an inspection subsystem. The method also includes filtering nuisances from the defect candidates by inputting information for the defect candidates into a first DL network. Output of the first DL network includes a first subset of the defect candidates not filtered as the nuisances. In addition, the method includes filtering nuisances from the first subset of the defect candidates by inputting high resolution images acquired for the first subset of the defect candidates into a second DL network. Output of the second DL network includes a final subset of the defect candidates not filtered as the nuisances. One or more components are executed by one or more computer systems, and the one or more components include the first and second DL networks. The method further includes designating the defect candidates in the final subset as defects on the specimen and generating results for the defects.

Each of the steps of the method described above may be further performed as described herein. In addition, the embodiment of the method described above may include any other step(s) of any other method(s) described herein. Furthermore, the method described above may be performed by any of the systems described herein.

Another embodiment relates to a non-transitory computer-readable medium storing program instructions executable on one or more computer systems for performing a computer-implemented method for detecting defects on a specimen. The computer-implemented method includes the steps of the method described above. The computer-readable medium may be further configured as described herein. The steps of the computer-implemented method may be performed as described further herein. In addition, the computer-implemented method for which the program instructions are executable may include any other step(s) of any other method(s) described herein.

BRIEF DESCRIPTION OF THE DRAWINGS

Further advantages of the present invention will become apparent to those skilled in the art with the benefit of the following detailed description of the preferred embodiments and upon reference to the accompanying drawings in which.

Figure 1:
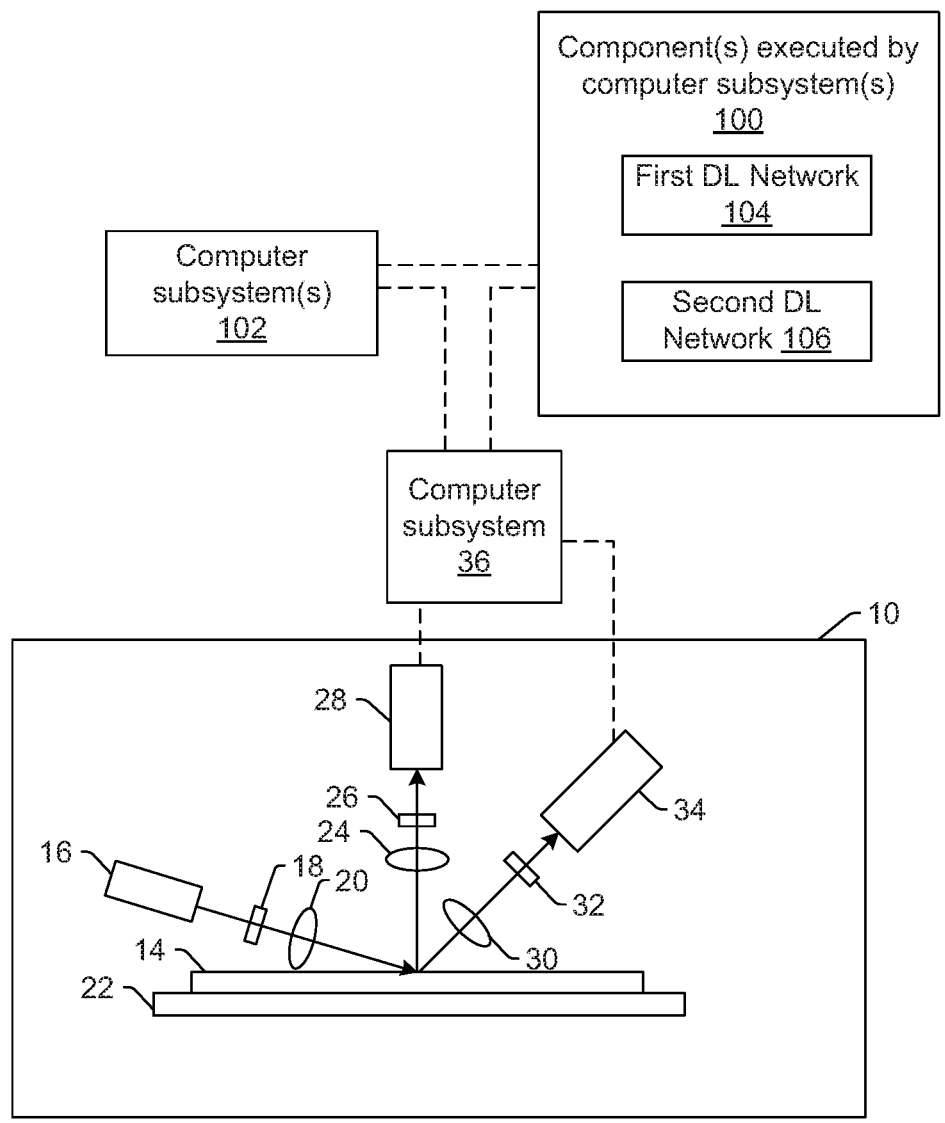
FIGS. 1 and 1a are schematic diagrams illustrating side views of embodiments of a system configured as described herein.

While the invention is susceptible to various modifications and alternative forms, specific embodiments thereof are shown by way of example in the drawings and are herein described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Turning now to the drawings, it is noted that the figures are not drawn to scale. In particular, the scale of some of the elements of the figures is greatly exaggerated to emphasize characteristics of the elements. It is also noted that the figures are not drawn to the same scale. Elements shown in more than one figure that may be similarly configured have been indicated using the same reference numerals. Unless otherwise noted herein, any of the elements described and shown may include any suitable commercially available elements.

One embodiment relates to a system configured to detect defects on a specimen. In one embodiment, the specimen is a wafer. The wafer may include any wafer known in the semiconductor arts. Although some embodiments may be described herein with respect to a wafer or wafers, the embodiments are not limited in the specimen for which they can be used. For example, the embodiments described herein may be used for specimens such as reticles, flat panels, personal computer (PC) boards, and other semiconductor specimens.

The embodiments described herein are particularly suitable for metal grain nuisance suppression by deep learning (DL). "Grain" as that term is used herein refers to dislocations in the crystalline structure of a metal (such as aluminum or copper). For example, in one embodiment, the specimen includes a metal upper layer. In one such embodiment, the upper layer may be an aluminum layer. The aluminum layer may include any suitable aluminum layer known in the art. The upper layer of the specimen may also include a back end of line (BEOL) layer, which may include any BEOL layer known in the art including those described herein. In a further embodiment, the upper layer of the specimen may be a re-distribution layer (RDL), which may have any suitable configuration known in the art.

The upper layer of the specimen may also include metal lines. For example, BEOL and RDL layers may include metal lines that form various elements of the devices being formed on the specimen. Such metal lines may produce a significant amount of "grain" noise, which is described further herein. The embodiments described herein are configured for enabling detection of defects on such layers despite the grain noise due to the nuisance filtering described herein.

In some embodiments, the specimen is a post-dice specimen. A "post-dice" specimen can be generally defined as a wafer or other substrate on which multiple devices have been formed (e.g., in different dies or dice) and then separated from each other in one of various ways. A "post-dice" specimen may also be a specimen that has been separated into multiple dies or dice, which have not yet entered the packaging process.

In another embodiment, the specimen includes a high noise layer. A "high noise" layer as that term is defined herein generally refers to a layer whose noise is the predominant obstacle in inspection of the layer. For example, while every wafer layer that is inspected by any inspection tool may exhibit more or less noise than other layers (and techniques for handling detection of such noise must in general be used in the inspection of every wafer layer), the primary obstacle in inspecting wafer layers successfully is most often the extremely small size of the defects that must be detected. In contrast, the embodiments described herein are particularly suitable for detecting relatively large "macro") defects of about 200 nm and above in size. Therefore, the primary obstacle in such inspection is not necessarily the size of the defects that must be detected (as many inspection tool configurations are capable of detecting such large defects on most layers). Instead, the layers described herein will in general exhibit such "high noise" levels in images generated for the layers that detecting defects of even such large sizes can be rendered difficult if not impossible. However, the embodiments described herein have been designed to handle such noise levels via the nuisance filtering described herein.

The embodiments described herein were designed to be particularly effective for filtering nuisances from such defects for a number of different reasons. For example, such defects tend to be relatively difficult to detect because they tend to be located in a substantially noisy (e.g., grainy) background. In one such example, substantial noise can be detected by inspection due to within RDL metal line noise, which may be caused by excessive metal grain. In another such example, substantial noise can be detected by inspection due to inter-RDL metal layer noise caused by transparent dielectric polymer on or under the RDL layer. As such, the ratio of false events versus the real killer defects of interest (DOIs) that are reported by previously used inspection systems and methods can be substantially high. However, the nuisance filtering described herein can be used to effectively eliminate the huge amount of nuisances that may be detected on the specimens described herein. In addition, using the single die inspection (SDI) or single image detection (SID) method described herein for detecting such defects will reduce the die-to-die defect detection source of noise.

In another embodiment, the inspection subsystem is configured for macro inspection. In this manner, the systems described herein may be referred to as a macro inspection tool. A macro inspection tool is particularly suitable for inspection of relatively noisy BEOL layers such as RDL and post-dice applications to detect defects in the presence of enormous noise such as grain on metal lines. A macro inspection tool is defined herein as a system that is not necessarily diffraction limited and has a spatial resolution of about 200 nm to about 2.0 microns and above. Such spatial resolution means that the smallest defects that such systems can detect have dimensions of greater than about 200 nm, which is much larger than the smallest defects that the most advanced inspection tools on the market today can detect, hence the "macro" inspector designation. Such systems tend to utilize longer wavelengths of light (e.g., about 500 nm to about 700 nm) compared to the most advanced inspection tools on the market today. These systems may be used when the DOIs have relatively large sizes and possibly also when throughputs of 100 wafers per hour (wph) or more are required (wafer throughput here refers to number of 300 mm wafers inspected per hour).

"Nuisances" as that term is used herein are defects that a user does not care about and/or events that are detected by inspection but are not actually defects. Nuisances that are detected as events (or "defect candidates") but are not actually defects may be detected due to non-defect noise sources on a specimen (e.g., line edge roughness (LER), relatively small critical dimension (CD) variation in patterned features, thickness variations, metal grain noise, etc.) and/or due to marginalities in the inspection subsystem itself or its configuration used for inspection. Generally, therefore, the goal of inspection is not to detect nuisances on specimens such as wafers.

One embodiment of a system configured to detect defects on a specimen is shown in FIG. 1. The system includes one or more computer subsystems (e.g., computer subsystem 36 and computer subsystem(s) 102) and one or more components 100 executed by the one or more computer subsystems. In some embodiments, the system includes inspection subsystem 10 configured for generating output (e.g., images) for a specimen. In one embodiment, the inspection subsystem is configured as an optical subsystem. For example, in the embodiment of FIG. 1, the inspection subsystem is configured for scanning light over or directing light to a physical version of the specimen while detecting light from the specimen to thereby generate the output for the specimen. The inspection subsystem may also be configured to perform the scanning (or directing) and the detecting with multiple modes.

In the embodiment of the system shown in FIG. 1, inspection subsystem 10 includes an illumination subsystem configured to direct light to specimen 14. The illumination subsystem includes at least one light source. For example, as shown in FIG. 1, the illumination subsystem includes light source 16. The illumination subsystem may be configured to direct the light to the specimen at one or more angles of incidence, which may include one or more oblique angles and/or one or more normal angles. For example, as shown in FIG. 1, light from light source 16 is directed through optical element 18 and then lens 20 to specimen 14 at an oblique angle of incidence. The oblique angle of incidence may include any suitable oblique angle of incidence. Which may vary depending on, for instance, characteristics of the specimen.

The inspection subsystem may be configured to direct the light to the specimen at different angles of incidence at different times. For example, the inspection subsystem may be configured to alter one or more characteristics of one or more elements of the illumination subsystem such that the light can be directed to the specimen at an angle of incidence that is different than that shown in FIG. 1. In one such example, the inspection subsystem may be configured to move light source 16, optical element 18, and lens 20 such that the light is directed to the specimen at a different oblique angle of incidence or a normal (or near normal) angle of incidence.

The inspection subsystem may be configured to direct light to the specimen at more than one angle of incidence at the same time. For example, the illumination subsystem may include more than one illumination channel, one of the illumination channels may include light source 16, optical element 18, and lens 20 as shown in FIG. 1 and another of the illumination channels (not shown) may include similar elements, which may be configured differently or the same, or may include at least a light source and possibly one or more other components such as those described further herein. If such light is directed to the specimen at the same time as the other light, one or more characteristics (e.g., wavelength, polarization, etc.) of the light directed to the specimen at different angles of incidence may be different such that light resulting from illumination of the specimen at the different angles of incidence can be discriminated from each other at the detector(s).

In another instance, the illumination subsystem may include only one light source (e.g., source 16 shown in FIG. 1) and light from the light source may be separated into different optical paths (e.g., based on wavelength, polarization, etc.) by one or more optical elements (not shown) of the illumination subsystem. Light in each of the different optical paths may then be directed to the specimen. Multiple illumination channels may be configured to direct light to the specimen at the same time or at different times (e.g., when different illumination channels are used to sequentially illuminate the specimen). In another instance, the same illumination channel may be configured to direct light to the specimen with different characteristics at different times. For example, in some instances, optical element 18 may be configured as a spectral filter and the properties of the spectral filter can be changed in a variety of different ways (e.g., by swapping out the spectral filter) such that different wavelengths of light can be directed to the specimen at different times. The illumination subsystem may have any other suitable configuration known in the art for directing the light having different or the same characteristics to the specimen at different or the same angles of incidence sequentially or simultaneously.

In one embodiment, light source 16 may include a broadband plasma (BBP) light source. In this manner, the light generated by the light source and directed to the specimen may include broadband light. However, the light source may include any other suitable light source such as a laser. The laser may include any suitable laser known in the art and may be configured to generate light at any suitable wavelength or wavelengths known in the art. In addition, the laser may be configured to generate light that is monochromatic or nearly-monochromatic. In this manner, the laser may be a narrowband laser. The light source may also include a polychromatic light source that generates light at multiple discrete wavelengths or wavebands.

Light from optical element 18 may be focused onto specimen 14 by lens 20. Although lens 20 is shown in FIG. 1 as a single refractive optical element, in practice, lens 20 may include a number of refractive and/or reflective optical elements that in combination focus the light from the optical element to the specimen. The illumination subsystem shown in FIG. 1 and described herein may include any other suitable optical elements (not shown). Examples of such optical elements include, but are not limited to, polarizing component(s), spectral filter(s), spatial filter(s), reflective optical element(s), apodizer(s), beam splitter(s), aperture(s), and the like, which may include any such suitable optical elements known in the art. In addition, the inspection subsystem may be configured to alter one or more of the elements of the illumination subsystem based on the type of illumination to be used for inspection.

The inspection subsystem may also include a scanning subsystem configured to cause the light to be scanned over the specimen. For example, the inspection subsystem may include stage 22 on which specimen 14 is disposed during inspection. The scanning subsystem may include any suitable mechanical and/or robotic assembly (that includes stage 22) that can be configured to move the specimen such that the light can be scanned over the specimen. In addition, or alternatively, the inspection subsystem may be configured such that one or more optical elements of the inspection subsystem perform some scanning of the light over the specimen. The tight may be scanned over the specimen in any suitable fashion such as in a serpentine-like path or in a spiral path.

The inspection subsystem further includes one or more detection channels. At least one of the one or more detection channels includes a detector configured to detect tight from the specimen due to illumination of the specimen by the subsystem and to generate output responsive to the detected light. For example, the inspection subsystem shown in FIG. 1 includes two detection channels, one formed by collector 24, element 26, and detector 28 and another formed by collector 30, element 32, and detector 34. As shown in FIG. 1, the two detection channels are configured to collect and detect light at different angles of collection. In some instances, both detection channels are configured to detect scattered light, and the detection channels are configured to detect light that is scattered at different angles from the specimen. However, one or more of the detection channels may be configured to detect another type of light from the specimen (e.g., reflected light).

As further shown in FIG. 1, both detection channels are shown positioned in the plane of the paper and the illumination subsystem is also shown positioned in the plane of the paper. Therefore, in this embodiment, both detection channels are positioned in (e.g., centered in) the plane of incidence. However, one or more of the detection channels may be positioned out of the plane of incidence. For example, the detection channel formed by collector 30, element 32, and detector 34 may be configured to collect and detect light that is scattered out of the plane of incidence. Therefore, such a detection channel may be commonly referred to as a "side" channel, and such a side channel may be centered in a plane that is substantially perpendicular to the plane of incidence.

Although FIG. 1 shows an embodiment of the inspection subsystem that includes two detection channels, the inspection subsystem may include a different number of detection channels (e.g., only one detection channel or two or more detection channels) In one such instance, the detection channel formed by collector 30, element 32, and detector 34 may form one side channel as described above, and the inspection subsystem may include an additional detection channel (not shown) formed as another side channel that is positioned on the opposite side of the plane of incidence. Therefore, the inspection subsystem may include the detection channel that includes collector 24, element 26, and detector 28 and that is centered in the plane of incidence and configured to collect and detect light at scattering angle(s) that are at or close to normal to the specimen surface. This detection channel may therefore be commonly referred to as a "top" channel, and the inspection subsystem may also include two or more side channels configured as described above. As such, the inspection subsystem may include at least three channels (i.e., one top channel and two side channels), and each of the at least three channels has its own collector, each of which is configured to collect light at different scattering angles than each of the other collectors.

As described further above, each of the detection channels included in the inspection subsystem may be configured to detect scattered light. Therefore, the inspection subsystem shown in FIG. 1 may be configured for dark field (DF) inspection of specimens. However, the inspection subsystem may also or alternatively include detection channels) that are configured for bright field (BF) inspection of specimens. In other words, the inspection subsystem may include at least one detection channel that is configured to detect light specularly reflected from the specimen. Therefore, the inspection subsystems described herein may be configured for only DF, only BF, or both DF and BF imaging. Although each of the collectors are shown in FIG. 1 as single refractive optical elements, each of the collectors may include one or more refractive optical element(s) and/or one or more reflective optical element(s).

The one or more detection channels may include any suitable detectors known in the art. For example, the detectors may include photo-multiplier tubes (PMTs), charge coupled devices (CCDs), time delay integration (TDI) cameras, and any other suitable detectors known in the art. The detectors may also include non-imaging detectors or imaging detectors. If the detectors are non-imaging detectors, each of the detectors may be configured to detect certain characteristics of the scattered light such as intensity but may not be configured to detect such characteristics as a function of position within the imaging plane. As such, the output that is generated by each of the detectors included in each of the detection channels of the inspection subsystem may be signals or data, but not image signals or image data. In such instances, a computer subsystem such as computer subsystem 36 may be configured to generate images of the specimen from the non-imaging output of the detectors. However, in other instances, the detectors may be configured as imaging detectors that are configured to generate image signals or image data. Therefore, the inspection subsystem may be configured to generate images in a number of ways.

It is noted that FIG. 1 is provided herein to generally illustrate a configuration of an inspection subsystem that may be included in the system embodiments described herein or that may generate output that is used by the system embodiments described herein. Obviously, the inspection subsystem configuration described herein may be altered to optimize the performance of the inspection subsystem as is normally performed when designing a commercial inspection system. In addition, the systems described herein may be implemented using an existing system (e.g., by adding functionality described herein to an existing system) such as the Altair series of tools that are commercially available from KLA, Milpitas, Calif. For some such systems, the embodiments described herein may be provided as optional functionality of the system (e.g., in addition to other functionality of the system). Alternatively, the inspection subsystem described herein may be designed "from scratch" to provide a completely new inspection subsystem. The inspection subsystem may be further configured as described in U.S. Pat. No. 7,782,452 issued Aug. 24, 2010 to Mehanian et al., which is incorporated by reference as if fully set forth herein.

Computer subsystem 36 may be coupled to the detectors of the inspection subsystem in any suitable manner (e.g., via one or more transmission media, which may include "wired"

and/or "wireless" transmission media) such that the computer subsystem can receive the output generated by the detectors during scanning of the specimen. Computer subsystem 36 may be configured to perform a number of functions described further herein using the output of the detectors.

The computer subsystems shown in FIG. 1 (as well as other computer subsystems described herein) may also be referred to herein as computer system(s). Each of the computer subsystem(s) or system(s) described herein may take various forms, including a personal computer system, image computer, mainframe computer system, workstation, network appliance, Internet appliance, or other device. In general, the term "computer system" may be broadly defined to encompass any device having one or more processors, which executes instructions from a memory medium. The computer subsystem(s) or system(s) may also include any suitable processor known in the art such as a parallel processor. In addition, the computer subsystem(s) or system(s) may include a computer platform with high speed processing and software, either as a standalone or a networked tool.

If the system includes more than one computer subsystem, then the different computer subsystems may be coupled to each other such that images, data, information, instructions, etc. can be sent between the computer subsystems as described further herein. For example, computer subsystem 36 may be coupled to computer subsystem(s 102 as shown by the dashed line in FIG. 1 by any suitable transmission media, which may include any suitable wired and/or wireless transmission media known in the art. Two or more of such computer subsystems may also be effectively coupled by a shared computer-readable storage medium (not shown).

Figure 1A:
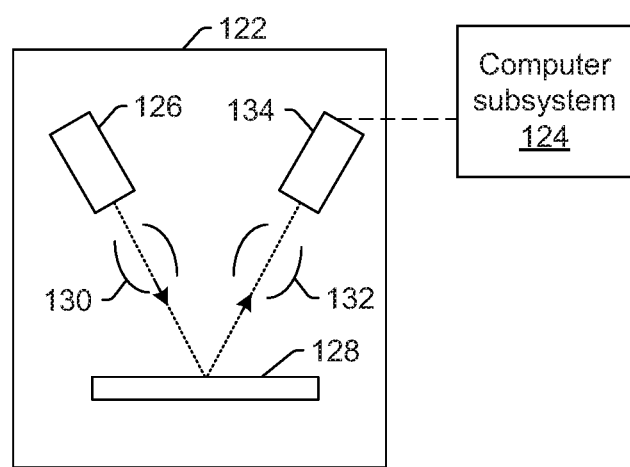

Although the inspection subsystem is described above as being an optical or light based inspection subsystem, in some embodiments, the inspection subsystem is configured as an electron beam subsystem. In one such embodiment shown in FIG. 1a, the inspection subsystem includes electron column 122 coupled to computer subsystem 124. As also shown in FIG. 1a, the electron column includes electron beam source 126 configured to generate electrons that are focused to specimen 128 by one or more elements 130. The electron beam source may include, for example, a cathode source or emitter tip, and one or more elements 130 may include, for example, a gun lens, an anode, a beam limiting aperture, a gate valve, a beam current selection aperture, an objective lens, and a scanning subsystem, all of which may include any such suitable elements known in the art.

Electrons returned from the specimen (e.g., secondary electrons) may be focused by one or more elements 132 to detector 134. One or more elements 132 may include, for example, a scanning subsystem, which may be the same scanning subsystem included in element(s) 130.

The electron column may include any other suitable elements known in the art. In addition, the electron column may be further configured as described in U.S. Pat. No. 8,664,594 issued Apr. 4, 2014 to Jiang et al., U.S. Pat. No. 8,692,204 issued Apr. 8, 2014 to Kojima et al., U.S. Pat. No. 8,698,093 issued Apr. 15, 2014 to Gubbens et al., and U.S. Pat. No. 8,716,662 issued May 6, 2014 to MacDonald et al., which are incorporated by reference as if fully set forth herein.

Although the electron column is shown in FIG. 1a as being configured such that the electrons are directed to the specimen at an oblique angle of incidence and are scattered from the specimen at another oblique angle, the electron beam may be directed to and scattered from the specimen at any suitable angles. In addition, the electron beam subsystem may be configured to use multiple modes to generate images of the specimen as described further herein (e.g., with different illumination angles, collection angles, etc.). The multiple modes of the electron beam subsystem may be different in any image generation parameters of the inspection subsystem.

Computer subsystem 124 may be coupled to detector 134 as described above. The detector may detect electrons returned from the surface of the specimen thereby forming electron beam images of the specimen. The electron beam images may include any suitable electron beam images. Computer subsystem 124 may be configured to perform one or more functions described further herein for the specimen using output generated by detector 134. Computer subsystem 124 may be configured to perform any additional step(s) described herein. A system that includes the inspection subsystem shown in FIG. 1a may be further configured as described herein.

It is noted that FIG. 1a is provided herein to generally illustrate a configuration of an electron beam subsystem that may be included in the embodiments described herein. As with the optical subsystem described above, the electron beam subsystem configuration described herein may be altered to optimize the performance of the inspection subsystem as is normally performed when designing a commercial inspection system. In addition, the systems described herein may be implemented using an existing system (e.g., by adding functionality described herein to an existing system) such as the eSxxx and eDR-xxxx series of tools that are commercially available from KLA. For some such systems, the embodiments described herein may be provided as optional functionality of the system (e.g., in addition to other functionality of the system). Alternatively, the system described herein may be designed "from scratch" to provide a completely new system.

Although the inspection subsystem is described above as being an optical or electron beam subsystem, the inspection subsystem may be an ion beam subsystem. Such an inspection subsystem may be configured as shown in FIG. 1a except that the electron beam source may be replaced with any suitable ion beam source known in the art. In addition, the inspection subsystem may be any other suitable ion beam subsystem such as those included in commercially available focused ion beam (FIB) systems, helium ion microscopy (HIM) systems, and secondary ion mass spectroscopy (SIMS) systems.

As noted above, the inspection subsystem is configured for scanning energy (e.g., light, electrons, etc.) over a physical version of the specimen thereby generating output for the physical version of the specimen. In this manner, the inspection subsystem may be configured as an "actual" subsystem, rather than a "virtual" subsystem. However, a storage medium (not shown) and computer subsystem(s) 102 shown in FIG. 1 may be configured as a "virtual" system. In particular, the storage medium and the computer subsystem(s) may be configured as a "virtual" inspection system as described in commonly assigned U.S. Pat. No. 8,126,255 issued on Feb. 28, 2012 to Bhaskar et al. and 9,222,895 issued on Dec. 29, 2015 to Duffy et al., both of which are incorporated by reference as if fully set forth herein. The embodiments described herein may be further configured as described in these patents.

As further noted above, the inspection subsystem may be configured to generate output for the specimen with multiple modes. In general, a "mode" can be defined by the values of parameters of the inspection subsystem used for generating output (e.g., images) for a specimen. Therefore, modes that are different are defined by different values for at least one parameter of the inspection subsystem (other than position on the specimen at which the output is generated). For example, in an optical inspection subsystem, different modes may use at least one different wavelength of light for illumination. The modes may be different in the illumination wavelengths as described further herein (e.g., by using different light sources, different spectral filters, etc. for different modes). In another example, different modes may use different illumination channels of the inspection subsystem. For example, as noted above, the inspection subsystem may include more than one illumination channel. As such, different illumination channels may be used for different modes. The modes may also or alternatively be different in one or more collection/detection parameters of the inspection subsystem. The inspection subsystem may be configured to scan the specimen with the different modes in the same scan or different scans, e.g., depending on the capability of using multiple modes to scan the specimen at the same time.

The computer subsystem(s) are configured for detecting defect candidates on a specimen based on output generated for the specimen by an inspection subsystem. "Defect candidates" as that term is used herein is defined as any event detected on a specimen and that is not filtered out as nuisances. For example, after defect detection, the defect candidates may include all of the events that were detected on a specimen and may include both actual defects (or DOIs) and nuisance. After nuisance filtering, the defect candidates will include all of the detected defect candidates that are not eliminated by nuisance filtering. Whether or not the defect candidates after nuisance filtering includes only DOIs depends on how good the nuisance filtering is at differentiating between DOIs and nuisances. After all of the nuisance filtering is performed, the remaining defect candidates may be designated as detected defects even if one or more of the designated defects is/are actually nuisance(s).

In one embodiment, detecting the defect candidates includes single image defect detection. For example, metal grain is the major nuisance in back end wafer inspection. Since metal grain is randomly distributed across specimens such as wafers across all the dies on a wafer), metal grain cannot be canceled by die-to-die differences. In particular, difference images generated by die-to-die subtractions for metal layers will include grain noise that cannot be canceled by the subtractions and that can be detected as events. In fact, the die-to-die difference based approach can amplify the noise from metal grain thereby making it impossible to detect the DOI. So currently used die-to-die defect approaches for detection and binning will not work for such specimens. As such, the embodiments described herein are configured for detecting and classifying defects in one die without using any reference dies. The embodiments described herein may detect DOI candidates and separate true DOI from metal grain nuisance by single die defect patch images through DL. The computer subsystem(s) described herein may be further configured for single image detection as described in U.S. Patent Application Publication No. 2017/0140524 published May 18, 2017 by Karsenti et al., which is incorporated by reference as if fully set forth herein. The embodiments described herein may be further configured as described in this patent application.

In another embodiment, the inspection subsystem is configured for generating the output using first and second modes, and detecting the defect candidates includes a first single image defect detection performed using only the output generated using the first mode, a second single image defect detection performed using only the output generated using the second mode, and reporting only the defect candidates detected in the first and second single image defect detections as the detected defect candidates. For example, as described further herein, the inspection subsystem may be configured to generate output for the specimen with multiple modes. The first and second modes may include any of the multiple modes that may be different in any values of any one or more parameters of the inspection subsystem. In one such example, the first mode may be a DF mode, and the second mode may be a BF mode. Although this embodiment is described with respect to first and second modes, the embodiment is not limited to just two modes. For example, the output that is generated using two or more modes of the inspection subsystem may be used in two or more defect detections, each performed separately as described further herein.

Figure 2:
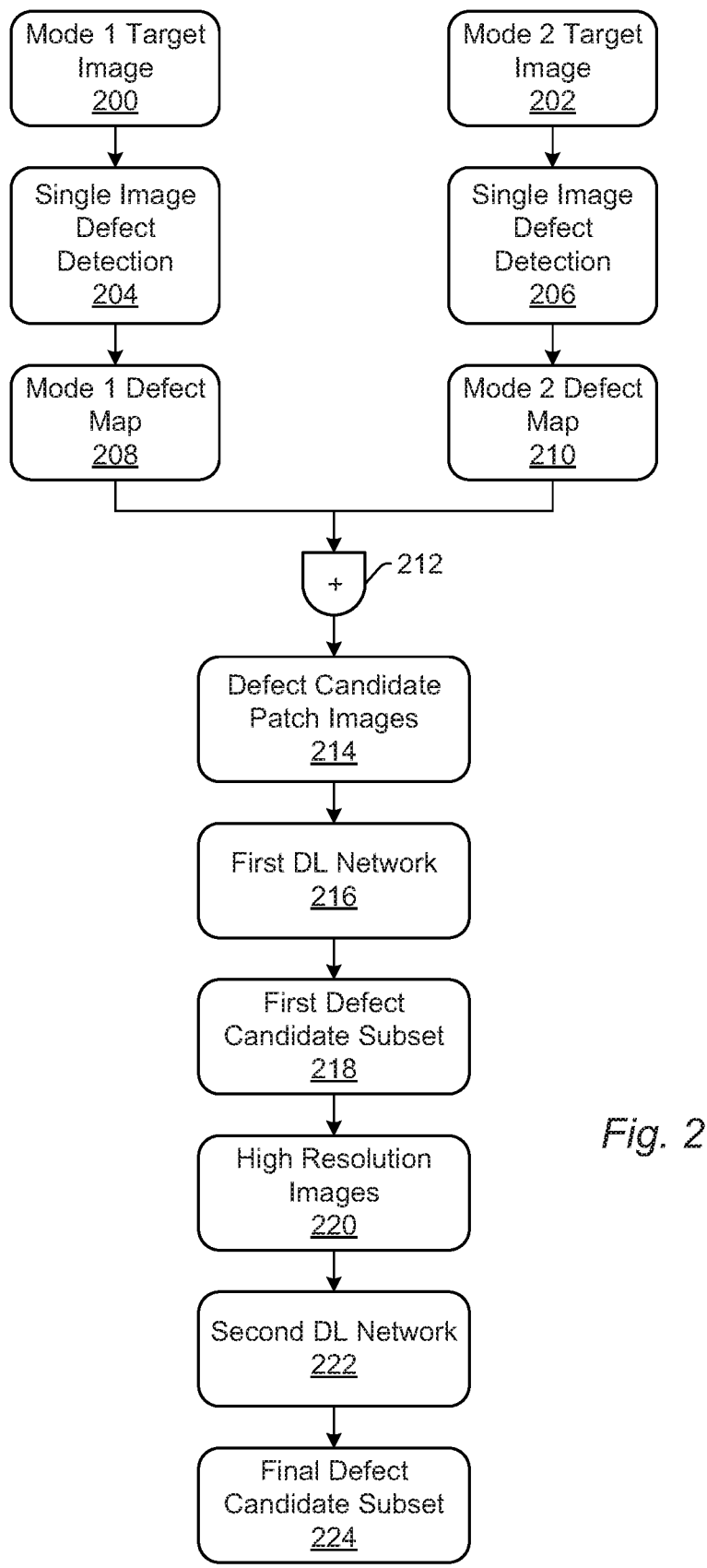
FIG. 2 is a flow chart illustrating one embodiment of steps that may be performed by the embodiments described herein for detecting defects on a specimen.

In one such embodiment, as shown in FIG. 2, the inspection subsystem may generate mode 1 target image 200 and mode 2 target image 202. The target images may be any test, target, or frame images generated by the inspection subsystem. The target images may have any suitable size and may be relatively small, patch images, whose size may depending on the configuration of the inspection subsystem and/or the computer processing of the output generated by the inspection subsystem. Target images 200 and 202 may otherwise be generated as described further herein.

As also shown in FIG. 2, the computer subsystem(s) may perform single image defect detection 204 using mode 1 target image 200 and single image defect detection 206 using mode 2 target image 202. Both defect detections 204 and 206 may be performed as described further herein. In this manner, the defect detection will be done only on target images. Due to the differences between the modes that generated the different target images, however, the parameters of the single image defect detections may be different. In general, both single image defect detections may include some form of a low pass (LP) filter and thresholding. For example, a low pass filter and thresholding (e.g., maximum gray level intensity thresholding) detection algorithm may be applied separately to the target images generated using different modes to identify defect candidates. In particular, in one embodiment, detecting the defect candidates includes applying low pass filtering and thresholding to the output generated for the specimen by the inspection subsystem. If the defect candidates are detected using more than one mode of the inspection subsystem, in one such embodiment, a first single image defect detection includes applying low pass filtering and thresholding to only the output generated using the first mode, and a second single image defect detection includes applying low pass filtering and thresholding to only the output generated using the second mode.

Output of the defect detections may then be input to the nuisance filtering steps described herein. The output of the defect detections may include any suitable defect detection results. For example, as shown in FIG. 2, output of single image defect detection 204 may include mode 1 defect map 208, and output of single image defect detection 206 may include mode 2 defect map 210. The defect candidates that are detected by the different defect detections may then be combined in step 212 using defect maps 208 and 210 to either report defect candidates that are detected by either mode or only defect candidates that are detected by both (or all modes). How the defect detection results are combined may vary depending on which modes are used for defect detection and how the output of those modes is affected by characteristics of the specimen. The output of the combining step may include defect candidate patch images 214, which may include arty suitable patch images for the defect candidates. The defect candidate patch images may include only images in which the defect candidates were detected (e.g., patch images for a defect candidate generated using mode 1 but not mode 2 if the defect candidate is detected only in mode 1) or all of the patch images corresponding to a location at which a defect candidate was detected (e.g., patch images for a defect candidate generated using modes 1 and 2 even if the defect candidate was not detected in both modes). The output of the combining step that is used in other steps described herein may also include any other results that can be generated by defect detection.

The defects that are detected on the layers and specimens described herein may include, for example, RDL metal line defects (shorts/bridges, opens/broken lines, metal residues/bottom bridges), via/contact defects (photoresist residues/via scumming), bump defects, micro-bump defects, copper pillar defects, after-stacking-of-chips defects, after chemical-mechanical processing (CMP) defects, and after-grinding defects, Therefore, the embodiments described herein can be used to monitor (and possibly correct) any of the processes that were performed on the specimen and resulted in such defects.

The component(s), e.g., component(s) 100 shown in FIG. 1, executed by the computer subsystem(s), e.g., computer subsystem 36 and/or computer subsystem(s) 102, include first deep learning (DL) network 104 and second DL network 106. The first DL network is configured for filtering nuisances from the defect candidates. The one or more computer subsystems input information for the defect candidates into the first DL network. Output of the first DL network includes a first subset of the defect candidates not filtered as the nuisances. The second DL network is configured for filtering nuisances from the first subset of the defect candidates. The one or more computer subsystems input high resolution images acquired for the first subset of the defect candidates into the second DL network. Output of the second DL network includes a final subset of the defect candidates not filtered as the nuisances.

The first and second DL networks therefore act as a metal grain filter into which the computer subsystem(s) pass the defect candidate results. The metal grain filtering is performed in two stages. In the first stage filtering, the first DL network will be trained on target images (patch images) of defect candidates and will be applied on a substantially high volume of defect candidates from the detection algorithm in leaf computing. For example, as shown in FIG. 2, defect detection results such as defect candidate patch images 214 may be input to first DL network 216. The first DL network may be configured as described herein to filter nuisances from the defect candidates thereby outputting first defect candidate subset 218. In this manner, the embodiments described herein may apply DL based binning to single die target images to filter out metal grain.

In the second stage filtering, the second DL network is trained on high resolution (e.g., defect review type) images and will be applied on a much smaller number of defect candidates from the first stage filtering. In this manner, the embodiments described herein may further apply DL based binning to high resolution images to suppress nuisance more. For example, high resolution images 220 may be acquired by the computer subsystem(s) as described further herein for the defect candidates in the first defect candidate subset. The computer subsystem(s) may input the high resolution images into second DL network 222 that filters the nuisances from the first defect candidate subset thereby generating final defect candidate subset 224. This two stage DL nuisance filtering approach advantageously allows the dramatic suppression of nuisance rates with acceptable throughput.

In one embodiment, the nuisances filtered from the defect candidates by the first DL network include metal grain nuisances. In another embodiment, the nuisances filtered from the first subset of the defect candidates by the second DL network include metal grain nuisances. In other words, both DL networks can filter metal grain nuisances, with the second DL network filtering any metal grain nuisances not filtered out by the first DL network. Although the embodiments described herein are particularly suitable for use in nuisance filtering for metal grain nuisances detected on specimens having a metal upper layer, the embodiments described herein can be used for nuisance filtering of any type of nuisances on any type of specimens.

The inventors have found through observation that most DOI and metal grain nuisances appear differently in patch images. For example, it appears that the true defects have some characteristics different from metal curves. Since human eyes and the brain can discern the differences, the inventors determined that a DL network could be trained to differentiate the differences in such patch images for removing the nuisances. In contrast, the existing nuisance filtering methods only rely on defect attributes that do not reflect the two-dimensional features of defects such as size, shape, etc. so they can't filter out the metal grain nuisances.

Although the embodiments described herein were specifically developed for nuisance filtering (two-class classification), the embodiments are not limited to just performing nuisance filtering. For example, the embodiments described herein can be easily extended to multiple class classification. In one such embodiment, the first DL network is further configured for filtering nuisances from the defect candidates and performing multiple class classification of the first subset of the defect candidates not filtered as the nuisances. Output of such an embodiment of the first DL network may include the first subset of the defect candidates not filtered as the nuisances and preliminary defect class IDs assigned to the defect candidates in the first subset. In another such embodiment, the second DL network is further configured for filtering nuisances from the first subset of the defect candidates and performing multiple class classification of the final subset of the defect candidates not filtered as the nuisances. Output of such an embodiment of the second DL network may include a final subset of the defect candidates not filtered as the nuisances and final defect class IDs assigned to the defect candidates in the final subset.

The first and second DL networks may be configured to perform multi-class classification as described herein, e.g., via a trained DL network with fully connected layers or another architecture described herein. The multi-class classification separates different types of defects into different classes, and the defect class IDs may have any suitable format that indicate different types of defects such as pattern defect, bridge, open, short, scratch, etc.

In some instances, it may be practical to have only one of the DL networks perform multi-class classification. For example, it may be practical for the first DL network to only perform nuisance filtering (a kind of two class classification) while only the second DL network performs nuisance filtering and multi-class classification. However, if the first DL network is also configured for multi-class classification, the classifications assigned to the detect candidates by the first network may be input to the second DL network, and the second DL network may use that information to classify the defect candidates in the final subset, which may include modifying or changing the classifications assigned to one or more of the defect candidates by the first DL network. Alternatively, the second DL network may perform multi-class classification independently of any multi-class classifications assigned by the first DL network, and the computer subsystem(s) may be configured to perform defect class arbitration for any defects that were assigned different defect classifications by the first and second DL networks.

Generally speaking, "deep learning" (also known as deep structured learning, hierarchical learning or deep machine learning) is a branch of machine learning based on a set of algorithms that attempt to model high level abstractions in data. In a simple case, there may be two sets of neurons: ones that receive an input signal and ones that send an output signal. When the input layer receives an input, it passes on a modified version of the input to the next layer. In a deep network, there are many layers between the input and output (and the layers are not made of neurons but it can help to think of it that way), allowing the algorithm to use multiple processing layers, composed of multiple linear and non-linear transformations.

Deep learning is part of a broader family of machine learning methods based on learning representations of data. An observation (e.g., an image) can be represented in many ways such as a vector of intensity values per pixel, or in a more abstract way as a set of edges, regions of particular shape, etc. Some representations are better than others at simplifying the learning task (e.g., face recognition or facial expression recognition). One of the promises of deep learning is replacing handcrafted features with efficient algorithms for unsupervised or semi-supervised feature learning and hierarchical feature extraction.

Research in this area attempts to make better representations and create models to learn these representations from large-scale unlabeled data. Some of the representations are inspired by advances in neuroscience and are loosely based on interpretation of information processing and communication patterns in a nervous system, such as neural coding which attempts to define a relationship between various stimuli and associated neuronal responses in the brain.

Machine learning can be generally defined as a type of artificial intelligence (AI) that provides computers with the ability to learn without being explicitly programmed. Machine learning focuses on the development of computer programs that can teach themselves to grow and change when exposed to new data. In other words, machine learning can be defined as the subfield of computer science that "gives computers the ability to learn without being explicitly programmed." Machine learning explores the study and construction of algorithms that can learn from and make predictions on data—such algorithms overcome following strictly static program instructions by making data driven predictions or decisions, through building a model from sample inputs.

The machine learning described herein may be further performed as described in "Introduction to Statistical Machine Learning," by Sugiyama, Morgan Kaufmann, 2016, 534 pages; "Discriminative, Generative, and Imitative Learning," Jebara, MIT Thesis, 2002, 212 pages; and "Principles of Data Mining (Adaptive Computation and Machine Learning)," Hand et al., MIT Press, 2001, 578 pages; which are incorporated by reference as if hilly set forth herein. The embodiments described herein may be further configured as described in these references.

Each of the DL networks may a deep neural network with a set of weights that model the world according to the data that it has been fed to train it. Neural networks can be generally defined as a computational approach which is based on a relatively large collection of neural units loosely modeling the way a biological brain solves problems with relatively large clusters of biological neurons connected by axons. Each neural unit is connected with many others, and links can be enforcing or inhibitory in their effect on the activation state of connected neural units. These systems are self-learning and trained rather than explicitly programmed and excel in areas where the solution or feature detection is difficult to express in a traditional computer program.

Neural networks typically consist of multiple layers, and the signal path traverses from front to back. The goal of the neural network is to solve problems in the same way that the human brain would, although several neural networks are much more abstract. Modern neural network projects typically work with a few thousand to a few million neural units and millions of connections. The neural network may have any suitable architecture and/or configuration known in the art.

In one embodiment, the first DL network includes a convolution neural network (CNN). A CNN usually includes stacks of convolution and pooling layers, to extract local features. The convolutional layer(s) may have any suitable configuration known in the art and are generally configured to determine features for an image as a function of position across the image (i.e., a feature map) by applying a convolution function to the input image using one or more filters. The one or more pooling layers may also have any suitable configuration known in the art (e.g., max pooling layers) and are generally configured for reducing the dimensionality of the feature map generated by the one or more convolutional layers while retaining the most important features. The first DL network may have any suitable CNN configuration or architecture known in the art.

In another embodiment, the first DL network includes a combination of convolution layers and fully connected layers. The convolution layers may be configured as described above. A "fully connected layer" may be generally defined as a layer in which each of the nodes is connected to each of the nodes in the previous layer. The fully connected layer(s) perform classification based on the features extracted by the convolutional layer(s). For example, the convolution layer(s) may be configured to generate a feature map thereby determining features for image(s), which may include any of the image(s) and inputs described further herein. The fully connected layer(s) are configured for feature selection and classification. In other words, the fully connected layer(s) select features from a feature map and then classify the defect candidates in the image(s) based on the selected features. The selected features may include all of the features in the feature map (if appropriate) or only some of the features in the feature map. Such a DL network (including the convolution layers(s) and the fully connected layer(s)) outputs defect candidate classifications, which may include a classification result per defect candidate with a confidence associated with each classification result. The results of the classification can also be used as described further herein. The classification may have any suitable format (such as a defect candidate ID, a defect description such as "pattern," "bridge," etc.). The classification results may be stored and used as described further herein.

In another embodiment, the second DL network includes a CNN. In a further embodiment, the second DL network includes a combination of convolution layers and fully connected layers. These embodiments of the second DL network may be configured as described further herein with respect to a CNN and combinations of convolution layers and fully connected layers.

In one embodiment, the CNN included in the first and second DL networks may be configured as an AlexNet. In general, an AlexNet includes a number of convolutional layers (e.g., 5) followed by a number of fully connected layers (e.g., 3) that are, in combination, configured and trained to classify images. Examples of neural networks configured as AlexNets are described in "ImageNet Classification with Deep Convolutional Neural Networks" by Krizhevsky et al., NIPS 2012, which is incorporated by reference as if fully set forth herein. The DL networks described herein may be further configured as described in this reference.

Figure 3:
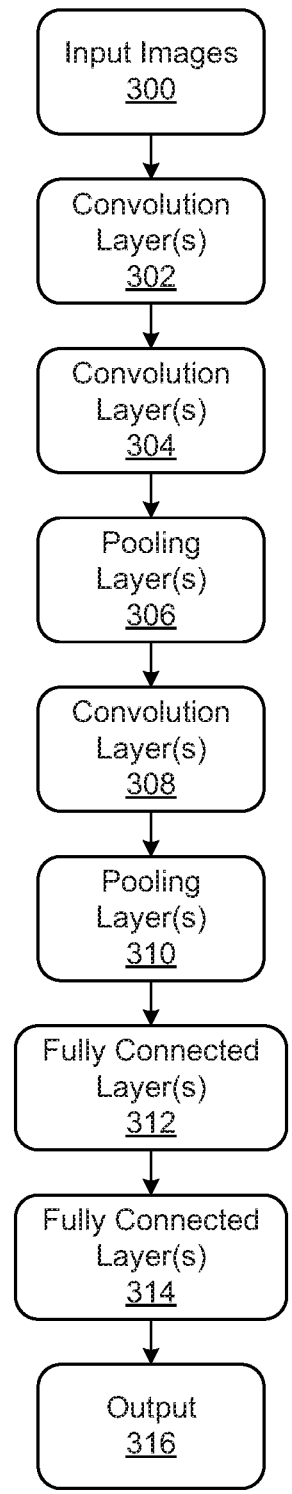
FIG. 3 is a schematic diagram illustrating one embodiment of deep learning network architecture that may be used for the first and second deep learning networks.

One simplified version of an AlexNet that may be used as the CNNs for the first and second DL networks is shown in FIG. 3. The input to the simplified AlexNet may include input images 300, which may include any of the images described herein such as patch images having a size of about 32 pixels by 32 pixels for any of the defect candidates detected on the specimen. The images are input to convolution layer(s) 302, which is/are followed by convolution layer(s) 304, pooling layer(s) 306, convolution layer(s) 308, and pooling layer(s) 310. These layers may be configured as described further herein. Output of the final pooling layer(s) is input to fully connected layer(s) 312, which may be followed by fully connected layer(s) 314. The fully connected layer(s) may be configured as described further herein. The last fully connected layer(s) may generate output 316, which may include any of the output described herein. For example, as described further herein, the output may include indications of which defect candidates are and which defect candidates are nuisances (e.g., metal grain noise and/or any other noise).

In another embodiment, the first and/or second DL network is/are configured as a GoogleNet. A GoogleNet may include convolutional, pooling, and fully connected layers such as those described further herein configured and trained to classify images. While the GoogleNet architecture may include a relatively high number of layers (especially compared to some other networks described herein), some of the layers may be operating in parallel, and groups of layers that function in parallel with each other are generally referred to as inception modules. Other of the layers may operate sequentially. Therefore, a GoogleNet is different from other networks described herein in that not all of the layers are arranged in a sequential structure. Examples of neural networks configured as GoogleNets are described in "Going Deeper with Convolutions," by Szegedy et al., CVPR 2015, which is incorporated by reference as if fully set forth herein. The DL networks described herein may be further configured as described in this reference.

In a further embodiment, the first and/or second DL network is/are configured as a VGG network. VGG networks were created by increasing the number of convolutional layers while fixing other parameters of the architecture. Adding convolutional layers to increase depth is made possible by using substantially small convolutional filters in all of the layers. Like the other networks described herein, VGG networks were created and trained to classify images. VGG networks also include convolutional layers followed by fully connected layers. Examples of neural networks configured as VGG are described in "Very Deep Convolutional Networks for Large-Scale Image Recognition," by Simonyan et al., ICLR 2015, which is incorporated by reference as if fully set forth herein. The networks described herein may be further configured as described in this reference.

In some embodiments, the first and/or second DL network is/are configured as a deep residual network. Like some other networks described herein, a deep residual network may include convolutional layers followed by fully connected layers, which are, in combination, configured and trained for image classification. In a deep residual network, the layers are configured to learn residual functions with reference to the layer inputs, instead of learning unreferenced functions. In particular, instead of hoping each few stacked layers directly fit a desired underlying mapping, these layers are explicitly allowed to fit a residual mapping, which is realized by feedforward neural networks with shortcut connections. Shortcut connections are connections that skip one or more layers. A deep residual net may be created by taking a plain neural network structure that includes convolutional layers and inserting shortcut connections which thereby takes the plain neural network and turns it into its residual learning counterpart. Examples of deep residual nets are described in "Deep Residual Learning for Image Recognition" by lie et al., NIPS 2015, which is incorporated by reference as if fully set forth herein. The networks described herein may be further configured as described in this reference.

The features determined by the DL networks may include any suitable features described further herein or known in the art that can be inferred from the input and used to generate the output described further herein. For example, the features may include a vector of intensity values per pixel. The features may also include any other types of features described herein, e.g., vectors of scalar values, vectors of independent distributions, joint distributions, or any other suitable feature types known in the art.

In one embodiment, the information for the defect candidates input to the first DL network by the one or more computer subsystems includes images of the defect candidates generated by the inspection subsystem. For example, only target patch images may be input directly to the trained first DL network (e.g., a CNN or other network described herein) to thereby separate out metal grain nuisance defects by DL. The target patch images may therefore be generated at the locations of the detected defect candidates and may have any suitable size (e.g., 32 pixels by 32 pixels) which may vary depending on, for example, the configuration of the inspection subsystem and/or the set up of the inspection subsystem used for generating output for the specimen.

In an additional embodiment, the information for the defect candidates input to the first DL network by the one or more computer subsystems do not include features of the defect candidates determined by the one or more computer subsystems. Therefore, the embodiments described herein are significantly different from many currently used nuisance filters. For example, many macro inspection classification methods are decision tree classifiers that are based on detection attributes. However, existing methods that are based on defect attributes may not reflect defect two-dimensional features such as size, shape, and so on when only given target images (e.g., often such features are determined from a difference image, which is not generated in the defect detection described herein). Therefore, the metal grain cannot be filtered out by the existing methods.

As described further herein, the first and second DL networks may have the same type (e.g., they may both be CNNs, they may both include convolutional layers and folly connected layers, they may both be simplified AlexNets as shown in FIG. 3, etc.). If both DL networks have the same type, they may or may not have the same configuration (Or architecture). For example, if both DL networks are simplified AlexNets, then both DL networks may have the architecture shown in FIG. 3 or the DL networks may have different architectures (one as shown in FIG. 3 and another with a variant of the configuration shown in FIG. 3).

In any case, although the first and second DL networks will generate the same outputs (defect candidates identified as defects (or at least not nuisances) and defect candidates identified as nuisances), but with different inputs, one or more parameters of the first and second DL networks will most likely be different. In other words, since the information input to the first DL network and the high resolution images input to the second DL network will have different resolutions and possibly even different imaging mechanisms (e.g., optical vs. electron beam), the first DL network cannot be effectively used for high resolution images. In addition, the defect candidate patch images that are input to the first DL network will not have a high enough resolution suitable for final disposition (filtering) of the defect candidates that is performed by the second DL network (due to the tradeoff commonly made in inspection where resolution is sacrificed for speed or throughput). As such, it would not be practical or even useful, in the embodiments described herein, to use the same images as the only images input to the first and second DL networks. Therefore, the different DL networks have to be built and trained differently. For example, if a DL CNN configuration is used for both inspection images and high resolution (review type) images, two different DL CNNs can be used for successful results. Once configurations for the first and second DL networks are selected, both of the DL networks will be trained to thereby set one or more parameters of the networks (e.g., weight(s), bias(es), etc.).

The training of the DL networks may be performed in any suitable manner known in the art. The training of both DL networks will be performed with a training set of the inputs that will be input to the different DL networks at runtime. For example, the training set for the first DL network will include information for known defects and known nuisances such as images generated by the inspection subsystem, while the training set for the second DL network will include high resolution images for known defects and known nuisances. In general, the training will proceed by altering one or more parameters of the DL networks until the known defects and known nuisances in the training sets are correctly classified by the DL networks. Therefore, the training of the first and second DL networks may be independent of each other and based on different training sets thereby generating trained first and second DL networks that will most likely have one or more different parameter settings.

Deep Learning based defect classification or binning is generally composed of two parts: first is network (model) training and second part is runtime inference. Just like any classification technique, you need a training step to train the classifier. And then in the actual runtime inspection, the classifier is applied to each defect candidate to arbitrate its class (bin). Similarly in Deep Learning techniques, a training step is needed at setup time. Once the DL model is trained (model information along with the weights or coefficients is trained using defect patch images with class ground truth), the model can be used in actual inline inspection as a postprocessing step to decide whether the defect candidate is a DOI or nuisance.

In the embodiments described herein, the training step may involve two to three steps. We may sample a sub-population of defects from a very hot scan, i.e., a scan in which the threshold used to detect defect candidates is at, very near, or within the noise floor of the output of the inspection subsystem, (without any DL network) from the entire wafer and perform the inspection with the DL network trained from the first time. Then we may sample another sub-population from the scan result. We may combine the two populations and train again to obtain a re-trained or second version of the DL network. And we may perform another scan with the second version of the DL network. If the result is good, where what qualifies as a good result may be user defined in any suitable manner, we may stop at the second version of the DL network and apply it as the trained one to the actual runtime inference, e.g., it can be added to the recipe and used in scanning other wafers of the similar type (layer).

Training of the DL networks described herein is also not limited to just first and second versions of the DL networks. For example, the steps described above can be repeated to generate even a third version of the DL networks. But the experience of the inventors has shown that two consecutive training yields a reasonable good DL network. In real inference, there is only one version of a DL network, which is the last (or best) DL network from the training.

The first and second DL networks may also be trained as described in U.S. Patent Application Publication Nos. 2019/0073566 published Mar. 7, 2019 by Brauer and 2019/0073568 published Mar. 7, 2019 by He et al., which are incorporated by reference as if fully set forth herein. The embodiments may be further configured as described in these publications. The computer subsystem(s) described herein may be configured for training the DL networks, or another system or method may train the DL networks and then make them available for use by the embodiments described herein.

The configuration and settings of the trained DL networks may also vary depending on the use case for which they are being implemented. For example, for different use cases, the DL networks will likely have to be constructed differently, e.g. with different numbers of layers, sizes, etc. Once the network configurations are determined, the process of training the DL networks with a sufficient amount of data (ground truth training data) will generate weights (coefficients) and possibly other parameters for the DL networks. So for different use cases, there may be different appropriate network configurations and different trained parameters.

As described further herein, the inspection may be performed with different modes (e.g., with different illumination channels, with different illumination wavelengths, with BF and DF, etc.). In addition, the high resolution images for the defect candidates may be generated with different modes (e.g., different angles of incidence, different angles of collection, etc.). Therefore, what is fed into the first and second DL networks for training and inference (runtime) may be selectable. However, the training and inference inputs should be consistent, i.e., if only BF patch images are used for training the first DL network, then during runtime inference, only BF images should be fed into the first DL network for binning purposes. In contrast, if the training of the first DL network uses both DF and BF images as inputs, then the runtime inference should be performed by inputting both DF and BF images into the first DL network. In a similar manner, if the training is performed using different patch images, then runtime inference should be performed using the same set of image patches with identical dimensions as the training time.

The first stage nuisance filtering performed by the first DL network can reduce the defect candidate counts significantly (e.g., from on the order of hundreds of thousands (say, 200K to 300K) to several hundred (say, 400 to 900)). However, due to the relatively low resolution limitation of the inspection subsystems that are typically used for inspection of specimens having metal upper layers, there may still be about a few hundred nuisances (e.g., 200 to 300) included in the defect candidates identified by the first DL network. The second stage nuisance filtering performed by the second DL network can however filter out all the remaining nuisances since high resolution images are input to the second DL network.

A "high resolution image," as that term is used herein, contains information about patterned features and/or defects on the specimen that is sufficient for the high resolution image to be used for applications such as defect review. Which may include defect classification and/or verification, and metrology. A "high resolution" as that term is used herein also refers to a resolution that is generally not used by inspection systems during routine operation, which are configured to sacrifice resolution capability for increased throughput. A "high resolution image" may also be referred to in the art as a "high sensitivity image" which is another term for a "high quality image." Different kinds of imaging subsystems may be configured for a high resolution. For example, to generate high quality electron beam images, the e/p, frames, etc., may be increased, which generates good quality scanning electron microscope (SEM) images but lowers the throughput considerably. These images are then "high sensitivity" images in that they can be used for high sensitivity defect detection. High resolution as that term is used herein, therefore, can be defined as a resolution that is higher than that at which inspection of the specimen is performed. In general, high resolution may also mean a significantly higher resolution than that at which inspection of the specimen is performed. For example, if the inspection is performed using an inspection subsystem configured for macro inspection, the high resolution images may be generated by a high resolution electron beam or ion beam tool such as a SEM.

In one embodiment, the computer subsystem(s) acquire the high resolution images from a defect review tool. For example, the optical and electron beam inspection subsystems described herein may be configured as defect review subsystems. In particular, the embodiments of the inspection subsystems described herein and shown in FIGS. 1 and 1a may be modified in one or more parameters to provide different imaging capability depending on the application for which they will be used. In one such example, the inspection subsystem shown in FIG. 1 may be configured to have a higher resolution if it is to be used for defect review rather than for inspection. In other words, the embodiments of the inspection subsystem shown in FIGS. 1 and 1a describe some general and various configurations for an imaging subsystem that can be tailored in a number of manners that will be obvious to one skilled in the art to produce imaging subsystems having different imaging capabilities that are more or less suitable for different applications.

Acquiring the high resolution images may, therefore, be performed using one of the imaging subsystems described herein (e.g., if one of the imaging subsystems is configured or modified for defect review type imaging capability, that imaging subsystem can be used to generate and thereby acquire high resolution images for the specimen). In this manner, acquiring the high resolution images may be performed using the physical specimen itself and some sort of imaging hardware. However, acquiring the high resolution images does not necessarily include imaging the specimen using imaging hardware. For example, another system and/or method may generate the high resolution images and may store the generated high resolution images in one or more storage media such as a virtual inspection system as described herein or another storage media described herein. Therefore, acquiring the high resolution images may include acquiring the high resolution images from the storage media in which they have been stored.

In this manner, the systems described herein may or may not include a defect review tool that generates the high resolution images. In some cases, the inspection subsystems described herein may be capable of generating both inspection type lower resolution images and defect review type higher resolution images. In such cases, the system may include only one imaging subsystem whose parameter(s) are modified between inspection and review. In other cases, the system may include two different imaging subsystems, one configured for inspection type lower resolution imaging and another configured for defect review type higher resolution imaging. In one such instance, the system may include both of the imaging subsystems shown in FIGS. 1 and 1a, the imaging subsystem shown in FIG. 1 may be configured for lower resolution inspection type imaging, and the imaging subsystem shown in FIG. 1a may be configured for higher resolution, defect review type imaging.

In another embodiment, the computer subsystem(s) include a third DL network configured for generating the high resolution images from the output generated by the inspection subsystem. In other words, a third DL network may be configured to transform (by inference) a relatively low resolution image into a much higher resolution image. The third DL network may include any suitable DL model or network known in the art, including for example, a neural network, a CNN, a generative model, etc. The third DL network may also be configured as described in commonly owned U.S. Patent Application Publication Nos. 2017/0140524 published May 18, 2017 by Karsenti et al., 2017/0148226 published May 25, 2017 by Zhang et al., 2017/01.93400 published Jul. 6, 2017 by Bhaskar et al., 2017/0193680 published Jul. 6, 2017 by Zhang et al., 2017/019.4126 published Jul. 6, 2017 by Bhaskar et al., 2017/0200260 published Jul. 13, 2017 by Bhaskar et al., 2017/0200264 published Jul. 13, 2017 by Park et al., 2017/0200265 published Jul. 13, 2017 by Bhaskar et al., 2017/0345140 published Nov. 30, 2017 by Zhang et al., 2017/0351952 published Dec. 7, 2017 by Zhang et al., 2018/0107928 published Apr. 19, 2018 by Zhang et al., 2018/0293721 published Oct. 11, 2018 by Gupta et al., 2018/0330511 published Nov. 15, 2018 by Ha et al., 2019/0005629 published Jan. 3, 2019 by Dandiana et al., and 2019/0073568 published Mar. 7, 2019 by He et al., which are incorporated by reference as if fully set forth herein. The embodiments described herein may be further configured as described in these patent application publications. In addition, the embodiments described herein may be configured to perform any steps described in these patent application publications.

The one or more computer subsystems are configured for designating the defect candidates in the final subset as defects on the specimen and generating results for the defects. The results for the defects may include any of the results described herein such as information, e.g., location, etc., of the bounding boxes of the detected defects, detection scores, information about the defect classifications such as class labels or IDs, etc., or any such suitable information known in the art. The results for the defects may be generated by the computer subsystem(s) in any suitable manner. The results for the defects may have any suitable form or format such as a standard file type. The computer subsystem(s) may generate the results and store the results such that the results can be used by the computer subsystem(s) and/or another system or method to perform one or more functions for the specimen or another specimen of the same type. Such functions include, but are not limited to, altering a process such as a fabrication process or step that was performed on the specimen in a feedback manner, altering a process such as a fabrication process or step that will be performed on the specimen in a feedforward manner, etc.

In contrast to the embodiments described herein, alternative methods may use traditional feature extraction approaches to extract features that can differentiate the DOI and nuisances. A decision tree or nearest neighbor classifier may then be applied to do the classification. Such an approach will require more in-depth study of the images, but may not achieve as good performance as CNN by DL since the networks described herein are more adaptive for particular problems by learning.

Each of the embodiments of each of the systems described above may be combined together into one single embodiment.

Another embodiment relates to a computer-implemented method for detecting defects on a specimen. The method includes detecting defect candidates on a specimen based on output generated for the specimen by an inspection subsystem. The method also includes filtering nuisances from the defect candidates by inputting information for the defect candidates into a first DL network. Output of the first DL network includes a first subset of the defect candidates not filtered as the nuisances. In addition, the method includes filtering nuisances from the first subset of the defect candidates by inputting high resolution images acquired for the first subset of the defect candidates into a second DL network. Output of the second DL network includes a final subset of the defect candidates not filtered as the nuisances. One or more components are executed by one or more computer systems. The one or more components include the first and second DL networks. The method further includes designating the defect candidates in the final subset as defects on the specimen and generating results for the defects.

Each of the steps of the method may be performed as described further herein. The method may also include any other step(s) that can be performed by the system, computer subsystem(s), and/or inspection subsystems described herein. The one or more computer systems, the one or more components, the DL networks, and the inspection subsystem may be configured according to any of the embodiments described herein, e.g., computer subsystem(s) 102, component(s) 100, first DL network 104, and second DL network 106, respectively. In addition, the method described above may be performed by any of the system embodiments described herein.

Figure 4:
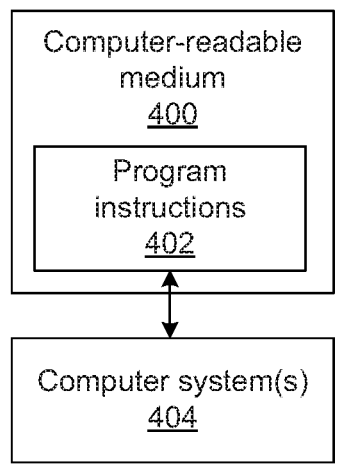
FIG. 4 is a block diagram illustrating one embodiment of a non-transitory computer-readable medium storing program instructions for causing one or more computer systems to perform a computer-implemented method described herein.

An additional embodiment relates to a non-transitory computer-readable medium storing program instructions executable on one or more computer systems for performing a computer-implemented method for detecting defects on a specimen. One such embodiment is shown in FIG. 4. In particular, as shown in FIG. 4, non-transitory computer-readable medium 400 includes program instructions 402 executable on computer system(s) 404. The computer-implemented method may include any step(s) of any method(s) described herein.

Program instructions 402 implementing methods such as those described herein may be stored on computer-readable medium 400. The computer-readable medium may be a storage medium such as a magnetic or optical disk, a magnetic tape, or any other suitable non-transitory computer-readable medium known in the art.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes ("MFC"), SSE (Streaming SIMD Extension) or other technologies or methodologies, as desired.

Computer system(s) 404 may be configured according to any of the embodiments described herein.

Further modifications and alternative embodiments of various aspects of the invention will be apparent to those skilled in the art in view of this description. For example, methods and systems for detecting defects on a specimen are provided. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A system configured to detect defects on a specimen, comprising:
   one or more computer subsystems configured for detecting defect candidates on a specimen based on output generated for the specimen by an inspection subsystem, wherein the inspection subsystem is configured for generating the output using first and second modes, and wherein detecting the defect candidates comprises a first single image defect detection performed using only the output generated using the first mode, a second single image defect detection performed using only the output generated using the second mode, and reporting only the defect candidates detected in the first and second single image defect detections as the detected defect candidates; and
   one or more components executed by the one or more computer subsystems, wherein the one or more components comprise:
      a first deep learning network configured for filtering nuisances from the defect candidates, wherein the one or more computer subsystems input information for the defect candidates into the first deep learning network, and wherein output of the first deep learning network comprises a first subset of the defect candidates not filtered as the nuisances; and
      a second deep learning network configured for filtering nuisances from the first subset of the defect candidates, wherein the one or more computer subsystems input high resolution images acquired for the first subset of the defect candidates into the second deep learning network, and wherein output of the second deep learning network comprises a final subset of the defect candidates not filtered as the nuisances; and wherein the one or more computer subsystems are further configured for designating the defect candidates in the final subset as defects on the specimen and generating results for the defects.

2. The system of claim 1, wherein detecting the defect candidates further comprises applying low pass filtering and thresholding to the output generated for the specimen by the inspection subsystem.

3. The system of claim 1, wherein the first single image defect detection comprises applying low pass filtering and thresholding to only the output generated using the first mode, and wherein the second single image defect detection comprises applying low pass filtering and thresholding to only the output generated using the second mode.

4. The system of claim 1, wherein the first deep learning network comprises a convolutional neural network.

5. The system of claim 1, wherein the first deep learning network comprises a combination of convolution layers and fully connected layers.

6. The system of claim 1, wherein the second deep learning network comprises a convolutional neural network.

7. The system of claim 1, wherein the second deep learning network comprises a combination of convolution layers and fully connected layers.

8. The system of claim 1, wherein the specimen comprises a metal upper layer.

9. The system of claim 1, wherein the nuisances filtered from the defect candidates by the first deep learning network comprise metal grain nuisances.

10. The system of claim 1, wherein the nuisances filtered from the first subset of the defect candidates by the second deep learning network comprise metal grain nuisances.

11. The system of claim 1, wherein the inspection subsystem is further configured for macro inspection.

12. The system of claim 1, wherein the one or more computer subsystems acquire the high resolution images from a defect review tool.

13. The system of claim 1, wherein the one or more components further comprise a third deep learning network configured for generating the high resolution images from the output generated by the inspection subsystem.

14. The system of claim 1, wherein the information for the defect candidates input to the first deep learning network by the one or more computer subsystems comprises images of the defect candidates generated by the inspection subsystem.

15. The system of claim 1, wherein the information for the defect candidates input to the first deep learning network by the one or more computer subsystems do not comprise features of the defect candidates determined by the one or more computer subsystems.

16. The system of claim 1, wherein the first deep learning network is further configured for filtering nuisances from the defect candidates and performing multiple class classification of the first subset of the defect candidates not filtered as the nuisances.

17. The system of claim 1, wherein the second deep learning network is further configured for filtering nuisances from the first subset of the defect candidates and performing multiple class classification of the final subset of the defect candidates not filtered as the nuisances.

18. The system of claim 1, wherein the inspection subsystem is further configured as an electron beam subsystem.

19. The system of claim 1, wherein the inspection subsystem is further configured as an optical subsystem.

20. The system of claim 1, wherein the specimen is a wafer.

21. A non-transitory computer-readable medium, storing program instructions executable on one or more computer systems for performing a computer-implemented method for detecting defects on a specimen, wherein the computer-implemented method comprises:
  detecting defect candidates on a specimen based on output generated for the specimen by an inspection subsystem, wherein the inspection subsystem is configured for generating the output using first and second modes, and wherein detecting the defect candidates comprises a first single image defect detection performed using only the output generated using the first mode, a second single image defect detection performed using only the output generated using the second mode, and reporting only the defect candidates detected in the first and second single image defect detections as the detected defect candidates;
  filtering nuisances from the defect candidates by inputting information for the defect candidates into a first deep learning network, wherein output of the first deep learning network comprises a first subset of the defect candidates not filtered as the nuisances;
  filtering nuisances from the first subset of the defect candidates by inputting high resolution images acquired for the first subset of the defect candidates into a second deep learning network, wherein output of the second deep learning network comprises a final subset of the defect candidates not filtered as the nuisances, wherein one or more components are executed by the one or more computer systems, and wherein the one or more components comprise the first and second deep learning networks; and
  designating the defect candidates in the final subset as defects on the specimen and generating results for the defects.

22. A computer-implemented method for detecting defects on a specimen, comprising:
  detecting defect candidates on a specimen based on output generated for the specimen by an inspection subsystem, wherein the inspection subsystem is configured for generating the output using first and second modes, and wherein detecting the defect candidates comprises a first single image defect detection performed using only the output generated using the first mode, a second single image defect detection performed using only the output generated using the second mode, and reporting only the defect candidates detected in the first and second single image defect detections as the detected defect candidates;
  filtering nuisances from the defect candidates by inputting information for the defect candidates into a first deep learning network, wherein output of the first deep learning network comprises a first subset of the defect candidates not filtered as the nuisances;
  filtering nuisances from the first subset of the defect candidates by inputting high resolution images acquired for the first subset of the defect candidates into a second deep learning network, wherein output of the second deep learning network comprises a final subset of the defect candidates not filtered as the nuisances, wherein one or more components are executed by one or more computer systems, and wherein the one or more components comprise the first and second deep learning networks; and
  designating the defect candidates in the final subset as defects on the specimen and generating results for the defects.

23. The system of claim 1, wherein the inspection subsystem is further configured to direct light to the specimen from a laser and to detect light from the specimen thereby generating the output for the specimen, and wherein the light from the specimen comprises scattered light.

24. The system of claim 1, wherein the inspection subsystem comprises multiple detection channels, wherein the output generated for the specimen by the inspection subsystem comprises images, and wherein the information for the defect candidates input into the first deep learning network comprises the images for the defect candidates generated by at least two of the multiple detection channels.

25. The system of claim 24, wherein the multiple detection channels comprise one top channel and two side channels.

26. The system of claim 24, wherein one of the multiple detection channels is configured for detecting light scattered from the specimen, and wherein another of the multiple detection channels is configured for detecting light reflected from the specimen.

27. The system of claim 1, wherein detecting the defect candidates further comprises comparing images generated for multiple dies on the specimen to each other, and wherein the information for the defect candidates input into the first deep learning network comprises the images generated for the multiple dies on the specimen.

\* \* \* \* \*